United States Patent [19]

Geerts

[11] Patent Number: 5,244,991
[45] Date of Patent: Sep. 14, 1993

[54] OLEFIN POLYMERIZATION PROCESS

[75] Inventor: Rolf L. Geerts, Bartlesville, Okla.

[73] Assignee: Phillips Petroleum Company, Bartlesville, Okla.

[21] Appl. No.: 775,389

[22] Filed: Oct. 15, 1991

[51] Int. Cl.$^5$ .............................................. C08F 4/54
[52] U.S. Cl. .................................... 526/141; 526/127; 526/142; 526/160; 526/352; 526/905; 502/102; 502/152; 502/153
[58] Field of Search ............... 526/127, 141, 142, 160, 526/905; 502/152, 153

[56] References Cited

U.S. PATENT DOCUMENTS

| | | | |
|---|---|---|---|
| 4,665,046 | 5/1987 | Campbell, Jr. ...................... | 502/102 |
| 4,716,257 | 12/1987 | Marks et al. ........................ | 585/275 |
| 5,066,739 | 11/1991 | Pettijohn et al. .................... | 526/127 |
| 5,109,085 | 4/1992 | Pettijohn et al. .................... | 526/160 |

OTHER PUBLICATIONS

J. Am. Chem. Soc. 109, 203–219 (1987).
Tilley et al., *Inorg. Chem.*, 20, 3267–3270 (1981).
Watson et al., *Inorg. Chem.*, 20, 3271–3278 (1981).

*Primary Examiner*—Fred Teskin
*Attorney, Agent, or Firm*—Edward L. Bowman

[57] ABSTRACT

A process for polymerizing olefins is disclosed which makes use of a catalyst comprising a cyclopentadienyl yttrium halide alkali metal electron donor complex in combination with a cocatalyst comprising an alkali or alkaline earth metal alkyl. Preferred embodiments include the use of hydrogen during the polymerization.

17 Claims, No Drawings

OLEFIN POLYMERIZATION PROCESS

FIELD OF THE INVENTION

The present invention relates to the polymerization of olefins. In a particular aspect the present invention relates to olefin polymerization employing a catalyst system comprising a yttrium metal containing compound.

BACKGROUND OF THE INVENTION

It is well known that olefins such as ethylene, propylene and 1-butene can be polymerized in the presence of certain metallic catalysts, particularly the reaction products of organometallic compounds and transition metal compounds, to form substantially linear polymers of relatively high molecular weight. Typically such polymerizations are carried out at relatively low temperatures and pressures.

It has bee proposed to use certain organolanthanide compounds as olefin polymerization catalysts. Ballard et al in *J.C.S. Chem Comm.*, (1978) pages 994 and 995 reported that certain alkyl bridged complexes of lanthanide metals such as $[(C_5H_5)_2ErCH_3]_2$ and $[(C_5H_4R)_2YCH_3]_2$, would polymerize ethylene. Marks and Mauermann in their U.S. Pat. No. 4,668,773 disclose that an ethylene polymerization catalyst could be obtained by reacting an anionic pentamethylcyclopentadienyl lanthanide halide lithium ether complex with a special type of lithium alkyl and then reacting that product with hydrogen to yield a catalyst of the general $[(C_5Me_5)_3LnH]_2$. The dimeric hydrido complex of Marks et al was reported to have activities as high as 3,000 grams of polyethylene per millimole Nd, however, the data also indicates that the catalyst had a very short lifetime (on the order of seconds to minutes). The overall productivity of the catalyst was thus quite low. The synthesis of this catalyst system was also very complex. It was a multi-step procedure that had to be carried out under rigorously anaerobic conditions. The procedure also requires the use of exotic organolithium compounds which contain no beta hydrogen or beta alkyl groups.

An object of the present invention is to provide a process under which anionic organoyttrium complexes can be made directly active to olefin polymerization by using simple metal alkyls.

Other aspects, objects, and advantages of the present invention will be apparent from the following disclosure.

SUMMARY OF THE INVENTION

In accordance with the present invention there is provided a process for polymerizing an olefin comprising contacting the olefin under suitable reaction conditions with a catalytic amount of a catalyst system comprising (1) a catalyst having a formula $Cp_nYX_{4-n}\cdot ML_x$ and (2) a cocatalyst comprising an alkali or alkaline earth metal alkyl. In a particularly preferred embodiment the polymerization is conducted in the presence of hydrogen.

DETAILED DESCRIPTION OF THE INVENTION

The cyclopentadienyl yttrium compounds employed in the present invention are selected from compounds of the formula $Cp_nYX_{4-n}\cdot ML_x$, wherein Cp is cyclopentadienyl or cyclopentadienyl substituted with an alkyl or alkyl silyl radical, M is an alkali metal, L is a suitable electron donor ligand, X is a halogen, n is 1 or 2, and x is a number corresponding to the value needed to form a stable complex.

Some specific examples of the Cp groups include cyclopentadienyl, ethyl cyclopentadienyl, trimethylcyclopentadienyl, trimethylsilylcyclopentadienyl, and pentamethylcyclopentadienyl. Generally, the substituents of the substituted cyclopentadienyl would each have 1 to 4 carbon atoms. The formula $H_5C_5$ is used herein to refer to cyclopentadienyl. The formula $Me_5C_5$ is used herein to refer to pentamethylcyclopentadienyl. Pentamethylcyclopentadienyl is also referred to herein as Cp*.

The halogens, X, of the above formula are preferably chloride or iodide.

M is an alkali metal. Generally the alkali metal would be selected from lithium, sodium and potassium.

The L of the above formula can be selected from any suitable electron donor ligand. Some specific examples of electron donor ligands include tetrahydrofuran, hereinafter referred to as THF, diethyl ether, and N,N,N',N',-tetramethylethylene diamine. Examples of such complexes include

$(Me_5C_5)_2YCl_2\cdot K(THF)_2$

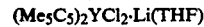

$(Me_5C_5)_2YCl_2\cdot Li(THF)$

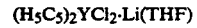

$(H_5C_5)_2YCl_2\cdot Li(THF)$

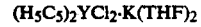

$(H_5C_5)_2YCl_2\cdot K(THF)_2$

Any suitable alkali or alkaline earth metal alkyl can be employed as the cocatalyst or the catalyst system. Generally alkyllithiums are preferred. Generally the alkyl radicals of the cocatalyst would contain 1 to 12 carbon atoms. Some specific examples of such cocatalysts including n-butyl sodium, n-butyl lithium, secondary butyl lithium, tertiary butyl lithium, n-butyl potassium, diethyl magnesium, di-n-butyl magnesium, and the like.

The anionic organoyttrium complexes can be prepared using techniques known in the art. In view of the fact that organoyttrium compounds in general are extremely air and moisture sensitive, all manipulations are preferably conducted under anaerobic conditions using standing Schlenk techniques.

The ratio of the catalyst to the cocatalyst can vary over a wide range depending upon the particular compounds employed and the particular results desired. As a general rule the molar ratio of the metal in the cocatalyst to the yttrium in the organoyttrium compound will be in the range of from about 0.5:1 to about 200:1, more commonly about 1:1 to about 100:1.

The present invention is particularly effective in polymerizing ethylene. It is also, however, within the scope of the present invention to employ other olefinic monomers. Examples of other such monomers include propylene, 4-methyl-1-pentene, butadiene, sytrene, propylene, and allyl trimethylsilane. The effectiveness of the polymerization for monomers other than ethylene will vary depending upon the specific yttrium catalyst employed.

The polymerizations can be carried out in either a solution or a slurry type process. Conventional polymerization diluents can be used in combination with the catalyst. Some typical examples of such diluents include aromatic and aliphatic hydrocarbons such as toluene, xylene, hexane, isobutane, heptane, ethyl benzene, decylene, cyclohexane, mineral spirits, and the like.

Hydrogen, when employed, can vary over a wide range, again depending upon the particular compounds employed as the catalyst and the particular results desired. Typically, the hydrogen would be employed at a pressure in the range of from about 10 to about 200 psi, more preferably about 15 to about 100 psi.

The temperature employed in the polymerization can also vary over a wide range depending upon the particular results desired. Generally, the polymerization temperature would be within the range of about 0° C. to about 170° C., more preferably about 15° C. to about 100° C.

A further understanding of the present invention and its various aspects and advantages will be provided by the following examples.

EXAMPLE I

To a rapidly stirred 100 ml of tetrahydrofuran was added cautiously 2 grams of yttrium trichloride. To the fine suspension in a dry box was added 5.05 grams of the potassium salt of pentamethylcyclopentadiene complexed with THF as a powder over a 10 min. period. After about 1 hour the solution had visibly become more homogeneous as the reaction proceeded. The solution was stirred overnight. The next morning the solution was carefully filtered to remove residual solids and the THF was removed by vacuum from the resulting filtrate. After the THF had been removed, there was about 5 grams of solid recovered from the filtrate. The dried solids were extracted with two 30 ml toluene washes and the solubles separated from the insolubles by filtration. The toluene filtrate yielded 0.63 grams of $Cp^*_2YCl \cdot THF$. The solids which were insoluble in the toluene when dried weighed 4.23 grams and were $Cp^*_2YCl_2K(THF)_2$. The symbol $Cp^*$ as used herein refers to pentamethyl cyclopentadienyl.

EXAMPLE II

The anionic potassium salt of pentamethylcyclopentadienyl yttrium dichloride of Example I was employed in a number of ethylene polymerization reactions under various conditions. The polymerizations were conducted in a stirred autoclave. Prior to their reactions, the autoclave was washed thoroughly and purged with nitrogen. The liquid polymerization diluent was added to the reactor and the desired temperature obtained and maintained. A 0.16 molar hexane solution of n-butyllithium was used as a cocatalyst. The reaction diluent was isobutane. The partial pressure of the ethylene was 100 psi. A summary of the results obtained is illustrated in Table I.

TABLE I

| | | | | $Cp^*_2YCl_2K(THF)_2$ | |
| | | Time | Yield | Productivity | |
| Run # | T (°C.) | (min.) | (gm) | gm/gm cat. hr. | gm/gm Y. hr. |
|---|---|---|---|---|---|
| 1 | 90 | 15 | 215 | 35,800 | 218,500 |
| 2 | 90 | 25 | 145.5 | 10,700 | 65,250 |
| 3 | 95 | 60 | 129 | 4,400 | 26,800 |
| 4 | 85 | 60 | 210 | 6,624 | 40,390 |
| 5 | 90 | 60 | 192 | 5,247 | 32,000 |
| 6 | 90 | 60 | 132 | 4,244 | 25,900 |

Table I demonstrates that the potassium salt of the pentamethylcyclopentadienyl yttrium dichloride is effective as an ethylene polymerization catalyst when used with an alkali metal cocatalyst.

EXAMPLE III

Into a 500 ml round bottomed flask in the dry box was placed 2.91 grams of pentamethylcyclopentadienyl lithium and 125 ml of THF. To this solution over a one-half hour period was added 2 grams of yttrium trichloride. A gray cream suspension resulted. This mixture was removed from the dry box and refluxed under nitrogen for 5 hours. A colorless solution resulted with fine suspended particles present. The tetrahydrofuran was removed from the solution to yield 6 grams of the solid $Cp^*_2YCl_2Li(THF)$.

EXAMPLE IV

The lithium salt prepared in Example III was employed in a number of ethylene polymerizations using conditions of generally the same type as those described for Example II. Again, the cocatalyst was butyllithium provided in the form of a 0.16 molar solution in hexane. The results are summarized in Table II.

TABLE II

| | | | | $Cp^*_2YCl_2Li(THF)$ | |
| | | Time | Yield | Productivity | |
| Run # | T (°C.) | (min.) | (gm) | gm/gm cat. hr. | gm/gm Y. hr. |
|---|---|---|---|---|---|
| 7 | 90 | 60 | 225 | 5,110 | 31,200 |
| 8 | 90 | 20 | 316 | 15,500 | 94,000 |
| 9 | 90 | 50 | 250 | 5,200 | 31,800 |

The results in Table II demonstrate that the lithium salt is likewise effective as a catalyst for the polymerization of ethylene when used with a butyllithium cocatalyst.

That which is claimed is:

1. A process for polymerizing an olefin comprising contacting said olefin under suitable reaction conditions with a catalytic amount of a catalyst system comprising a catalyst having the formula $Cp_nYX_{4-n} \cdot ML_x$ and a cocatalyst comprising an alkali or alkaline earth metal alkyl, wherein Cp is cyclopentadienyl or cyclopentadienyl substituted with an alkyl or alky silyl radical, M is an alkali metal, L is a suitable electron donor ligand, X is a halogen, n is 1 or 2, and x is a number in the range of 1 and 3 corresponding to the value needed to form a stable complex.

2. A process according to claim 1 wherein said cocatalyst is selected from alkali metal alkyls having β-hydrogen or β-alkyl groups.

3. A process according to claim 2 wherein Cp is pentamethylcyclopentadienyl.

4. A process according to claim 2 wherein L is selected from THF, diethylether, and N,N,N', N'-tetramethylethylene diamine.

5. A process according to claim 2 wherein L is THF.

6. A process according to claim 5 wherein said catalyst is selected from complexes of the formula $(Me_5C_5)_2YCl_2 \cdot K(THF)_2$ $(Me_5C_5)_2YCl_2 \cdot Li(THF)$ $(H_5C_5)_2YCl_2 \cdot Li(THF)$ $(H_5C_5)_2YCl_2 \cdot K(THF)_2$.

7. A process according to claim 6 wherein said cocatalyst comprises a butyl lithium.

8. A process according to claim 7 wherein said polymerization is conducted in the presence of hydrogen in an amount sufficient to increase the active life of the catalyst system.

9. A process according to claim 8 wherein said catalyst consists essentially of a complex of the formula (Me₅C₅)₂YCl₂·K(THF)₂ and said cocatalyst consists essentially of butyl lithium.

10. A process according to claim 7 wherein said catalyst consists essentially of a complex of the formula (Me₅C₅)₂YCl₂·K(THF)₂ and said cocatalyst consists essentially of butyl lithium.

11. A process according to claim 5 wherein said catalyst consists essentially of a complex of the formula (Me₅C₅)₂YCl₂·K(THF)₂ or (Me₅C₅)₂YCl₂·Li(THF).

12. A process according to claim 11 wherein said cocatalyst consists essentially of n-butyl lithium.

13. A process according to claim 12 wherein the molar ratio of Li to Y is about 1:1.

14. A process according to claim 5 wherein said polymerization is conducted in the presence of hydrogen in an amount sufficient to increase the active life of the catalyst system.

15. A process according to claim 1 wherein said polymerization is conducted in the presence of hydrogen in an amount sufficient to increase the active life of the catalyst system.

16. A process according to claim 11 wherein said polymerization is conducted in the presence of hydrogen in an amount sufficient to increase the active life of the catalyst system.

17. A process according to claim 2 wherein said polymerization is conducted in the presence of hydrogen in an amount sufficient to increase the active life of the catalyst system.

* * * * *